(12) United States Patent
Ishihara et al.

(10) Patent No.: US 11,136,943 B2
(45) Date of Patent: Oct. 5, 2021

(54) EVAPORATIVE FUEL PROCESSING SYSTEM

(71) Applicant: DENSO CORPORATION, Kariya (JP)

(72) Inventors: Keiichirou Ishihara, Kariya (JP); Tomohiro Itoh, Kariya (JP); Yasuo Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 16/659,788

(22) Filed: Oct. 22, 2019

(65) Prior Publication Data

US 2020/0132023 A1 Apr. 30, 2020

(30) Foreign Application Priority Data

Oct. 26, 2018 (JP) .............................. JP2018-201675

(51) Int. Cl.
*F02M 25/08* (2006.01)
*F02D 41/00* (2006.01)
*B60K 15/035* (2006.01)
*F02D 41/22* (2006.01)

(52) U.S. Cl.
CPC ... *F02M 25/0818* (2013.01); *B60K 15/03504* (2013.01); *F02D 41/0045* (2013.01); *F02D 2041/225* (2013.01)

(58) Field of Classification Search
CPC ........... F02M 25/0818; F02M 25/0809; F02M 25/0836; F02M 25/089; F02D 41/0045; F02D 2041/225; B60K 15/03504; B60K 2015/03514
See application file for complete search history.

(56) References Cited

FOREIGN PATENT DOCUMENTS

JP 2012-21502 2/2012

*Primary Examiner* — Xiao En Mo
(74) *Attorney, Agent, or Firm* — Nixon & Vanderhye PC

(57) ABSTRACT

The evaporative fuel processing system includes a fuel tank, a canister, a pump, a pressure detection unit, a temperature detection unit, and a leak diagnosis unit a leak diagnosis unit configured to diagnose leak in the diagnostic object based on a first pressure change which is a change in pressure detected by the pressure detection unit when the temperature in the diagnostic object changes, a second pressure change which is a change in pressure detected by the pressure detection unit when the inside of the diagnostic object is pressurized or depressurized by the pump, a detected temperature by the temperature detection unit, a first preparation information and a second preparation information.

11 Claims, 11 Drawing Sheets

(a1<a2<a3, T1<T2<T3)

( a1<a2<a3, T1<T2<T3 )

EVAPORATIVE FUEL PROCESSING SYSTEM

CROSS REFERENCE TO RELATED APPLICATION

The present application is based on Japanese Patent Application No. 2018-201675 filed on Oct. 26, 2018, disclosure of which are incorporated herein by reference.

TECHNICAL FIELD

The present disclosure relates to an evaporative fuel processing system.

BACKGROUND

An evaporative fuel processing system that processes evaporative fuel generated in a fuel tank of an internal combustion engine discloses a technology for determining the presence or absence of a leak based on change in the internal pressure of the fuel tank.

SUMMARY

One aspect of the present disclosure provides an evaporative fuel processing system that includes
a fuel tank that stores fuel of an internal combustion engine,
a canister that adsorbs evaporative fuel generated in the fuel tank,
a pump that pressurizes and depressurizes an inside of a diagnostic object including the fuel tank,
a pressure detection unit configured to detect the pressure in the evaporative fuel processing system,
a temperature detection unit configured to detect the temperature in the diagnostic object, and
a leak diagnosis unit configured to diagnose leaks in the diagnostic object.
The leak diagnosis unit diagnoses leaks based on
a first pressure change which is a change in pressure detected by the pressure detection unit when the temperature in the diagnosis object changes,
a second pressure change which is a change in pressure detected by the pressure detection unit when the inside of the diagnosis object is pressurized or depressurized by the pump,
a detected temperature by the temperature detection unit,
a first preparation information in which a relationship between a physical quantity relating to the leak degree in the diagnostic object, a physical property value relating to the volatility of the fuel, the temperature in the diagnostic object, and the first pressure change is determined in advance, and
a second preparation information in which a relationship between a physical quantity relating to the leak degree in the diagnostic object, a physical property value relating to the volatility of the fuel, the temperature in the diagnostic object, and the second pressure change is determined in advance.

DETAILED DESCRIPTION

First Embodiment

An evaporative fuel processing system according to the first embodiment will be described with reference to FIGS. 1 to 4.

Figure 1:
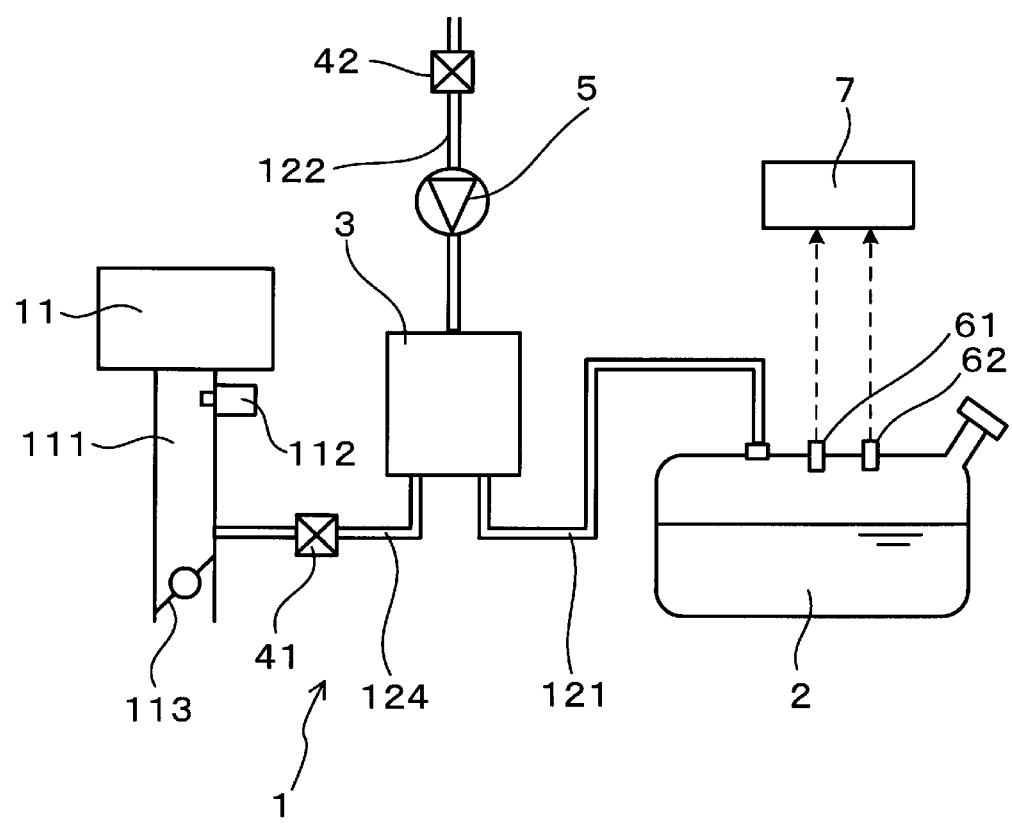
FIG. 1 is a configuration explanatory view of an evaporative fuel processing system according to a first embodiment.

As shown in FIG. 1, the evaporative fuel processing system 1 of the present embodiment has a fuel tank 2, a canister 3, a pump 5, a pressure detection unit 61, a temperature detection unit 62, and a leak diagnosis unit 7.

The fuel tank 2 stores fuel for an internal combustion engine 11. The canister 3 adsorbs evaporative fuel generated in the fuel tank 2. The pump 5 pressurizes or depressurizes an inside of a diagnostic object including the fuel tank 2. The pressure detection unit 61 detects the pressure in the diagnostic object. The temperature detection unit 62 detects the temperature in the diagnostic object. The leak diagnosis unit 7 diagnoses a leak of the diagnostic object. For example, the pressure detection unit 61 is configured by a pressure sensor, and the temperature detection unit 62 is configured by a temperature sensor.

The leak diagnosis unit 7 is configured to diagnose the leak of the diagnostic object based on a first pressure change, a second pressure change, a temperature detected by the temperature detection unit 62, first preparation information, and second preparation information described below. The leak diagnosis unit 7 is configured by ECU (Electric Control Unit). The ECU is composed of a CPU serving as computing means, a microcomputer having a RAM and a ROM as a storage means, and so on.

The first pressure change is a change in pressure detected by the pressure detection unit 61 when the temperature in the diagnostic object changes. The second pressure change is a change in pressure detected by the pressure detection unit 61 when the pressure in the diagnostic object is increased or decreased by the pump 5.

The first preparation information is preparation information in which a relationship among a physical quantity relating to the leak degree in the diagnostic object, a physical property value regarding a volatility of the fuel, the temperature in the diagnostic object, and the first pressure change are obtained in advance. The second preparation information is preparation information in which a relationship among a physical quantity relating to the leak degree of the diagnostic object, a physical property value regarding a volatility of the fuel, the temperature in the diagnostic object, and the second pressure change are obtained in advance.

The detected temperature is a temperature in the diagnostic object detected by the temperature detection unit 62. A plurality of detected temperatures can be present as described later. Then, the leak diagnosis unit 7 can perform leak diagnosis using a plurality of detected temperatures. Moreover, the leak of the diagnostic object means the leak of the gas between the inside and the outside of the diagnostic object.

In the present embodiment, the pump 5 is configured to pressurize the inside of the diagnostic object. Then, the second pressure change is a pressure change in the diagnostic object in a state in which pressurization by the pump 5 is stopped after the inside of the diagnostic object is pressurized to a predetermined pressure.

As shown in FIG. 1, the fuel tank 2 and the canister 3 are connected via an evaporative fuel passage 121. That is, the evaporated fuel evaporated in the fuel tank 2 leads to the canister 3 through the evaporative fuel passage 121 connected to the top of the fuel tank 2.

The canister 3 and the intake system 111 of the internal combustion engine 11 are connected via a purge passage 124. The purge passage 124 is provided with a purge valve 41. The purge valve 41 is configured to control supply of the evaporative fuel from the canister 3 to the intake system 111 by its turning on and off, that is, opening and closing the purge passage 124. In the intake system 111, an injector 112 is provided in the vicinity of an intake port of the internal combustion engine 11. Further, the purge passage 124 is connected at a downstream of a throttle valve 113 in the intake system 111.

The canister 3 is connected to a vent passage 122 for introducing the atmospheric air. The pump 5 is connected to the vent passage 122 together with a vent valve 42. In the present embodiment, the pump 5 and the vent valve 42 are connected in series. The pump 5 is connected between the vent valve 42 and the canister 3 in the vent passage 122.

In the present embodiment, the pump 5 is configured to supply the atmospheric air to the canister 3 from the atmosphere side. By closing the purge valve 41 and the vent valve 42, the inside of the system including both the canister 3 and the fuel tank 2 is fully closed. In the present embodiment, this fully closed system is the diagnostic object. Then, the pump 5 is operated in a state where the purge valve 41 is closed, and the vent valve 42 is opened. Thereby, the pressure in the diagnostic object can be pressurized. Thereafter, by also closing the vent valve 42, the inside of the diagnostic object can be fully closed at a positive pressure.

In the present embodiment, the purge valve 41 and the vent valve 42 are both configured by solenoid valves.

In the present embodiment, the pressure detection unit 61 is provided in the fuel tank 2. However, the arrangement position of the pressure detection unit 61 is not limited to the inside of the fuel tank 2, and the pressure detection unit 61 may be provided, for example, in the evaporative fuel passage 121. In addition, the temperature detection unit 62 is also provided in the fuel tank 2. However, the arrangement position of the temperature detection unit 62 is not limited to the inside of the fuel tank 2 and the temperature detection unit 62 may be provided, for example, in the evaporative fuel passage 121. The pressure detection unit 61 and the temperature detection unit 62 are provided in the top of the fuel tank 2. The temperature detection unit 62 detects the temperature of the gas in the diagnostic object.

As described later, the leak diagnosis unit 7 performs leak diagnosis using the first preparation information and the second preparation information based on the information of the pressure detected by the pressure detection unit 61 and the information of the temperature detected by the temperature detection unit 62.

Further, in the present embodiment, the diameter of the leak hole generating in the diagnostic object such as the fuel tank 2 and the evaporative fuel passage 121 can be adopted as the physical quantity related to the leak degree of the fuel. Here, the diameter of the leak hole can be defined, for example, as a circle equivalent diameter, that is, a diameter of a circle having an area equivalent to the area of the leak hole. The physical quantity relating to the leak degree is not limited to the diameter of the leak hole, and, for example, the area of the leak hole can also be adopted.

Further, as the physical property value regarding the volatility of the fuel, a Reid vapor pressure of the fuel can be adopted. The Reid vapor pressure is the vapor pressure of gasoline at 37.8° C. As the physical property value regarding the volatility of the fuel, not only Reid vapor pressure but vapor pressure etc. at specific temperature can be also adopted, for example.

The evaporative fuel processing system 1 of the present embodiment is mounted on a vehicle. The vehicle is a vehicle provided with an internal combustion engine, and may be a hybrid vehicle or the like. And, as fuel, it is possible to use gasoline, diesel fuel or the like.

In the present embodiment, the leak diagnosis by the leak diagnosis unit 7 can be performed after the vehicle is stopped. The stop of the vehicle can be, for example, a stop of the engine (internal combustion engine) of the vehicle or a system stop of the hybrid vehicle. That is, the vehicle stop can be detected by the signal showing these stops.

Figure 2:
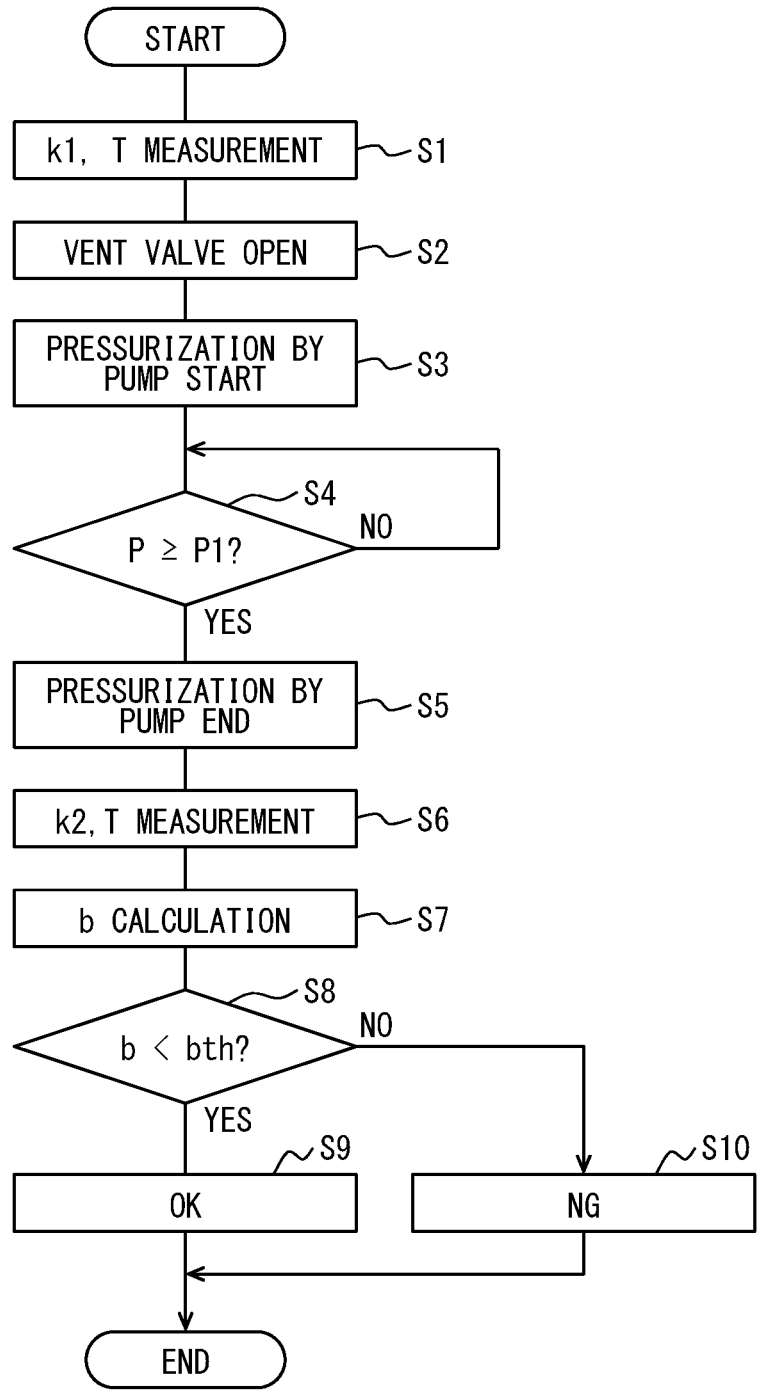
FIG. 2 is a flowchart of leak diagnosis in the first embodiment.

One example of a method of leak diagnosis by the leak diagnosis unit 7 will be described with reference to the flow of FIG. 2.

First, immediately after the vehicle stops, the change in pressure detected by the pressure detection unit 61 is measured. That is, the first pressure change is measured (see step S1). At this time, the purge valve 41 and the vent valve 42 are closed. Specifically, the change amount of the detection value of the pressure detection unit 61 within a predetermined time, that is, the pressure change rate is measured. Hereinafter, this pressure change rate is referred to as a first pressure change rate k1.

Immediately after the vehicle stops, heat transfer from the internal combustion engine at high temperature to the fuel tank 2 occurs, so the temperature in the diagnostic object including the fuel tank 2 easily rises. Due to the rise in the pressure of the evaporative fuel in the diagnostic object accompanying the above temperature rise, the pressure rises. The pressure change rate, which is the amount of increase per unit time of the pressure, is measured as the first pressure change rate k1. In addition, the temperature detection unit 62 detects the temperature T in the diagnostic object in at least a part of the measurement period of the first pressure change rate k1.

Next, the vent valve 42 is opened and pressurization by the pump 5 is started (see steps S2 and S3). As a result, the inside of the diagnostic object is fully closed and pressurized. The pump 5 continues pressurization until the pressure P in the diagnostic object reaches a predetermined pressure P1 sufficiently higher than the atmospheric pressure (see step S4). When the pressure P in the diagnostic object reaches the predetermined pressure P1, the pump 5 is stopped (see step S5).

Next, immediately after the pump 5 is stopped, a change in pressure detected by the pressure detection unit 61 is measured. That is, the second pressure change is measured (see step S6). Specifically, the pressure change amount within a predetermined time, that is, the pressure change rate is measured. Hereinafter, this pressure change rate is referred to as a second pressure change rate k2.

In the state where the pressure in the diagnostic object is increased to the predetermined pressure, after stopping the pump 5, the pressure in the diagnostic object is maintained or decreases toward the atmospheric pressure. The pressure change rate increases in accordance with the physical quantity (in the present embodiment, the diameter of the leak hole) related to the leak degree. The pressure change rate, which is the amount of decrease per unit time of the pressure, is measured as the second pressure change rate k2. In addition, the temperature detection unit 62 detects the temperature T in the diagnostic object in at least a part of the measurement period of the second pressure change rate k2.

Then, the physical quantity related to the leak degree, that is, the diameter b of the leak hole in the present embodiment is calculated based on the first pressure change rate k1 and the detected temperature T measured in step S1, the second pressure change rate k2 and the detected temperature T measured in step S6, the first preparation information, and the second preparation information (see step S7). The calculation of the diameter b of the leak hole in this step S7 will be described later.

Next, the diameter b of the leak hole calculated in step S7 is compared with a threshold value bth (see step S8). If the diameter b of the leak hole is smaller than the threshold bth, it is determined that there is no abnormal leak, that is, normal (see step S9). On the other hand, when the diameter b of the leak hole is equal to or larger than the threshold bth, it is determined that there is an abnormal leak (see step S10).

The calculation of the diameter b of the leak hole in step S7 will be described below.

The first preparation information can be prepared as a first map MAP1 in which a relationship among the Reid vapor pressure a, the diameter b of the leak hole, the temperature T, and the first pressure change rate k1 is obtained in advance. Since the above first map MAP1 has to be described as a four-dimensional map, it is difficult to illustrate as one figure. However, as shown in FIG. 3, after setting the diameter b to b1 to b3, a plurality of graphs T corresponding to a plurality of temperatures T1 to T3 with the Reid vapor pressure a on a horizontal axis and the first pressure change rate k1 on a vertical axis can be shown.

Figure 3:
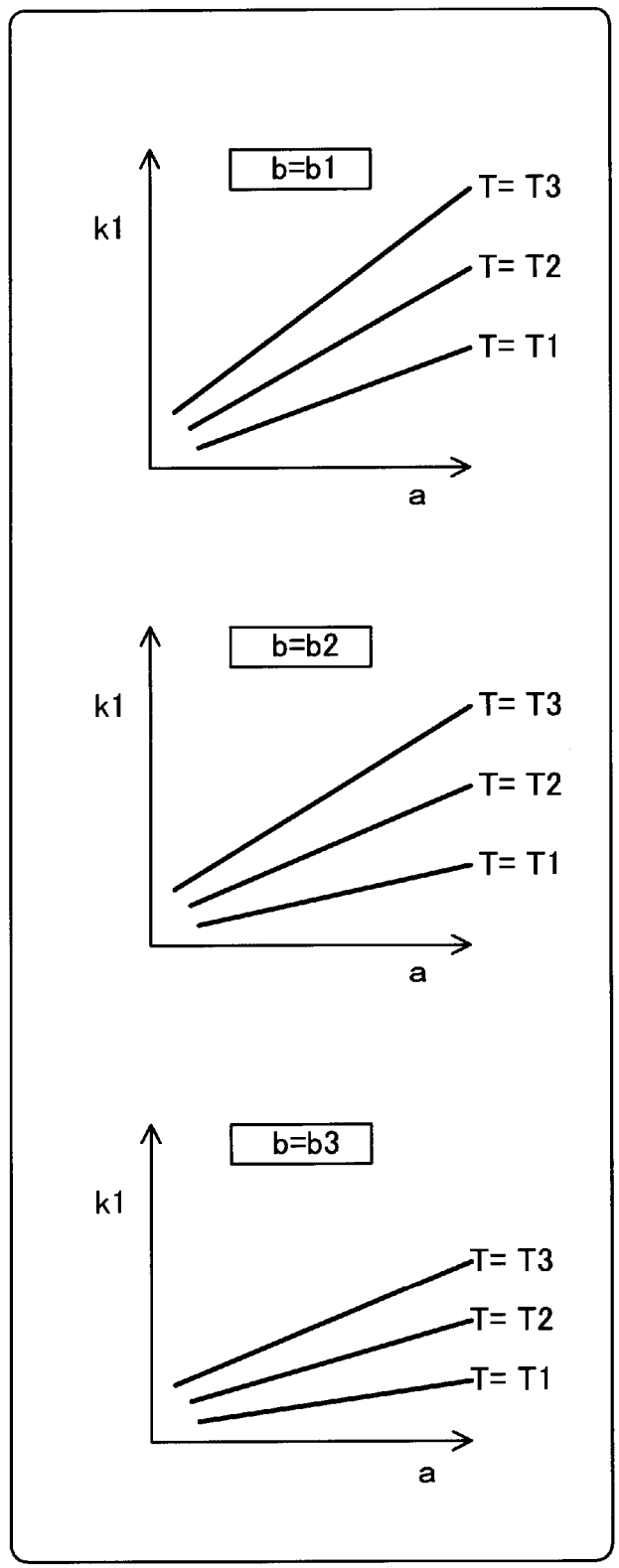
FIG. 3 is an explanatory diagram of a first map in the first embodiment.

The diameter b1 to b3 of the leak hole shown in FIG. 3 are specific values having a relationship of b1<b2<b3. Also, the temperature T1 to T3 are specific values having a relationship of T1<T2<T3. In addition, FIG. 3 is a schematic image figure to the last. The same applies to FIG. 4 described later.

The first pressure change rate k1 tends to be faster as the Reid vapor pressure a increases, and is likely to be suppressed as the diameter b of the leak hole is larger, and tends to be faster as the temperature T is higher. Therefore, the first pressure change rate k1 can be expressed as these functions f (a, b, T).

Figure 4:
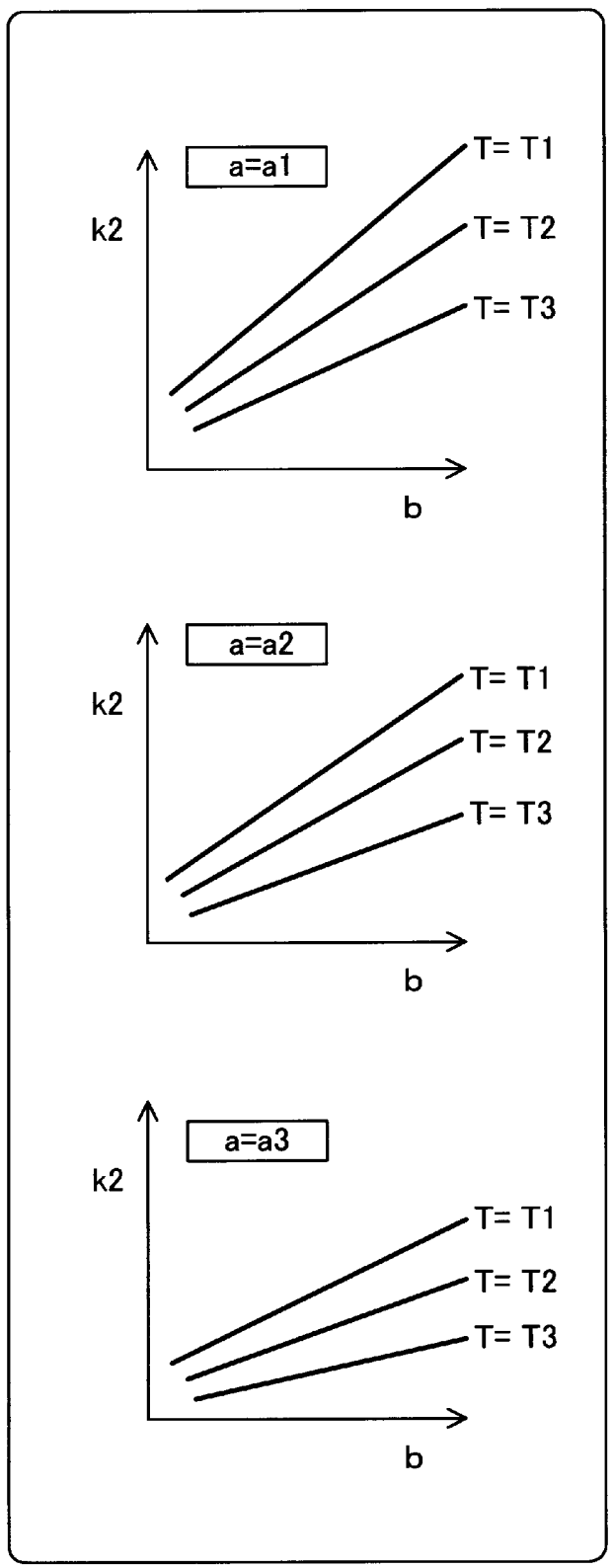
FIG. 4 is an explanatory diagram of a second map in the first embodiment.

The second preparation information can be prepared as a second map MAP2 in which a relationship among the Reid vapor pressure a, the diameter b of the leak hole, the temperature T, and the second pressure change rate k2 is obtained in advance. Since the above second map MAP2 has to be described as a four-dimensional map, it is difficult to illustrate as one figure. However, as shown in FIG. 4, after setting the Reid vapor pressure a to a1 to a3, a plurality of graphs T corresponding to a plurality of temperatures T1 to T3 with the diameter b of the leak hole on a horizontal axis and the second pressure change rate k2 on a vertical axis can be shown. The Reid vapor pressure a1 to a3 shown in FIG. 4 are specific values having a relationship of a1<a2<a3.

Since the second pressure change rate k2 is a rate at which the pressure decreases from the pressurized state toward the atmospheric pressure, the second pressure change rate K2 tends to be faster as the diameter b of the leak hole is larger, and is likely to be suppressed as the Reid vapor pressure a is larger, and is more easily suppressed as the temperature T is higher. Therefore, the second pressure change rate k2 can be expressed as these functions g (a, b, T). However, the function f (a, b, T) of the first pressure change rate and the function g (a, b, T) of the second pressure change rate are different from each other.

Here, it is difficult to grasp not only the diameter b of the leak hole but also the Reid vapor pressure a of the fuel by direct measurement or the like. However, as described above, the temperature T can be detected by the temperature detection unit 62, and can be measured at the time of the first pressure change and the second pressure change. In the flow described above, the temperature T is measured at each time point.

One temperature T measured at any one time point can also be T in the function f (a, b, T) and the function g (a, b, T). In addition, it is premised that a temperature change occurs at the time of the first pressure change, and the temperature T at one specific point during the first pressure change may be adopted or the temperatures T at plural points during the first pressure change may be adopted. In this case, a plurality of temperatures T exist in the function f (a, b, T). Also, an average value of the temperature during the first pressure change can be adopted as the temperature T. Although the method of adopting the above mentioned temperature T may have some influence on the calculation accuracy of the diameter b of the leak hole, there is no change in that the diagnosis accuracy can be improved by the leak diagnosis method of the present embodiment.

In the two functions f (a, b, T) and g (a, b, T), the temperature T may be different from one another. Also, there may be more than one temperature T in each function. For example, the detected temperature T can also be obtained at a plurality of time points during the pressure measurement. Even in that case, since a plurality of temperatures T are obtained as specific measurement values, the variables are two, a and b.

Therefore, the function f (a, b, T) of the first pressure change rate and the function g (a, b, T) of the second pressure change rate are functions f (a, b) and g (a, b) having substantially two variables.

Then, by using the first pressure change rate k1 measured in step S1 and the second pressure change rate k2 measured in step S6, the following two equations, that is, simultaneous equations are obtained.

$$k1=f(a,b)$$

$$k2=g(a,b)$$

By solving the above simultaneous equations, variables a and b are calculated. That is, the diameter b of the leak hole can be calculated. Then, as described above, the diameter b of the leak hole can be compared with the reference threshold bth, and the leak diagnosis can be performed.

The present embodiment provides the following functions and advantages.

In the evaporative fuel processing system 1, the leak diagnosis unit 7 is configured to diagnose a leak in the diagnostic object based on the first pressure change, the second pressure change, the temperature in the diagnostic object, the first preparation information, and the second preparation information. Thereby, the diagnostic accuracy by the leak diagnosis unit 7 can be increased.

That is, the first pressure change and the second pressure change, which are a plurality of pressure changes different from each other, are measured, and the leak degree of the diagnostic object, that is, the diameter b of the leak hole is calculated by using the measurement result of both pressure changes. This makes it possible to estimate the diameter b of the leak hole with high accuracy while appropriately eliminating the factor of fuel volatility.

In particular, even when the temperature change during the first pressure change is small and the first pressure change rate k1 is small, highly accurate leak diagnosis becomes possible by using the first pressure change rate k1, the second pressure change rate k2, the first preparation information, and the second preparation information. As a situation where the temperature change at the time of the first pressure change becomes small, for example, in a hybrid car or the like, it is assumed that the vehicle travels using a motor without using the internal combustion engine 11 for a predetermined period before the vehicle stops.

In such a case, since the temperature of the internal combustion engine 11 is not particularly high, the amount of heat transferred to the fuel tank 2 is small immediately after the vehicle is stopped, and the temperature change in the fuel tank 2 tends to be small. Then, the first pressure change may be small, and it may be difficult to perform the leak diagnosis only by using the first pressure change. On the other hand, as described above, by using the first pressure change rate k1, the second pressure change rate k2, the first preparation information, and the second preparation information, highly accurate leak diagnosis can be performed.

In the present embodiment, the second pressure change is a pressure change in the diagnostic object in a state in which pressurization by the pump 5 is stopped after the inside of the diagnostic object is pressurized to a predetermined pressure. Therefore, it is possible to diagnose leaks in the diagnostic object more accurately. That is, when pressurizing the inside of the diagnostic object, the volatilization of fuel in the diagnostic object is suppressed. Then, the influence of the pressure change due to the evaporation of the fuel with respect to the second pressure change is suppressed. As a result, leak diagnosis can be performed with higher accuracy.

As described above, according to the present embodiment, it is possible to provide an evaporative fuel processing system capable of performing leak diagnosis with high accuracy.

Second Embodiment

Figure 5:
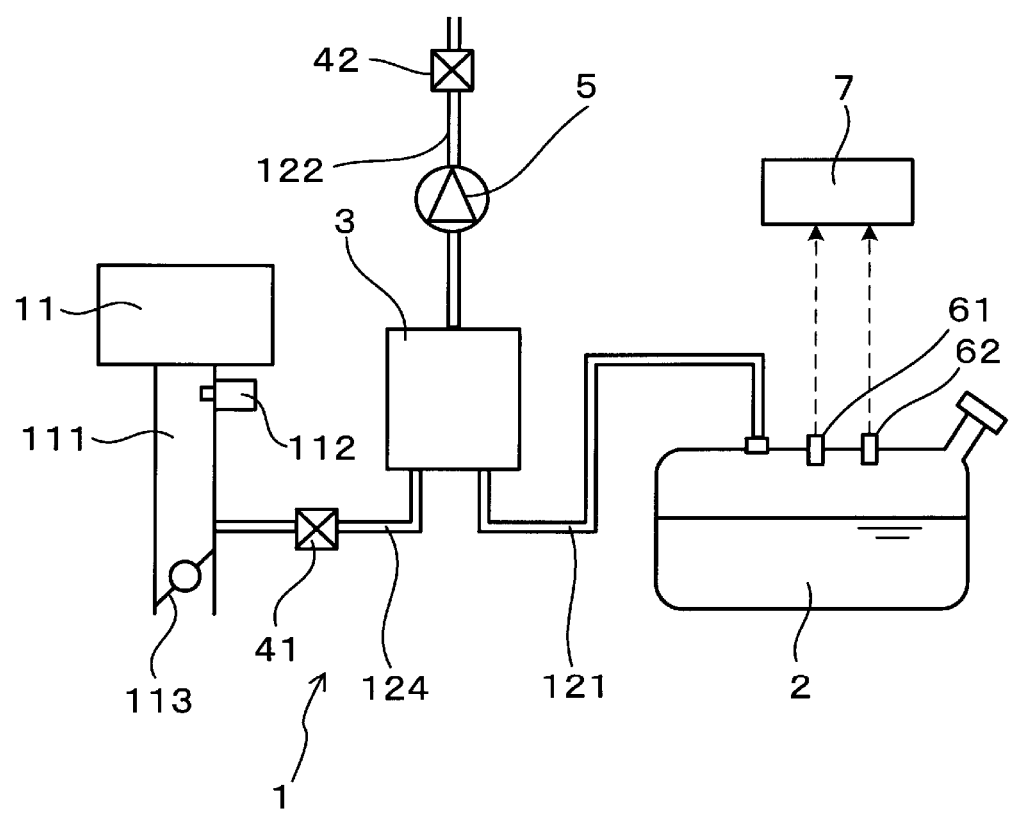
FIG. 5 is a configuration explanatory view of an evaporative fuel processing system according to a second embodiment.
Figure 6:
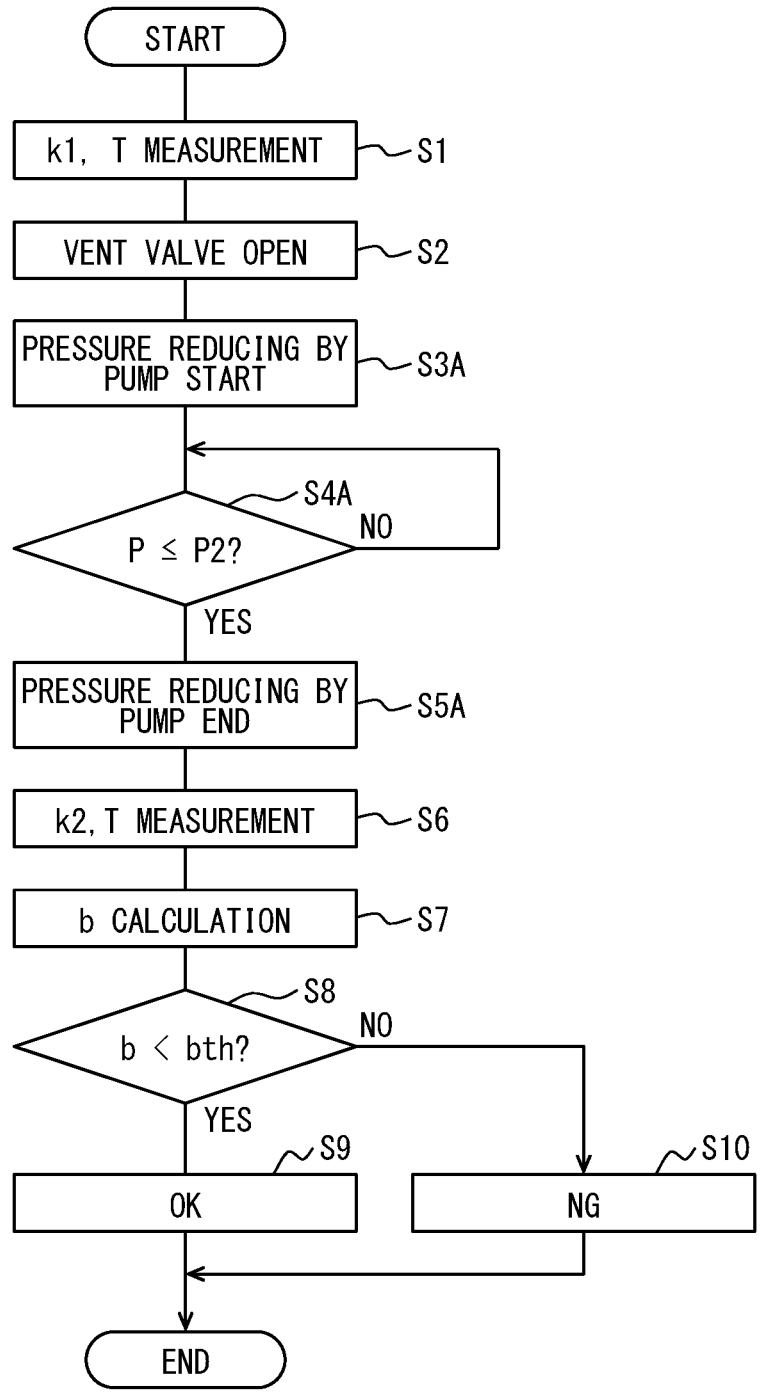
FIG. 6 is a flowchart of leak diagnosis in the second embodiment.
Figure 7:
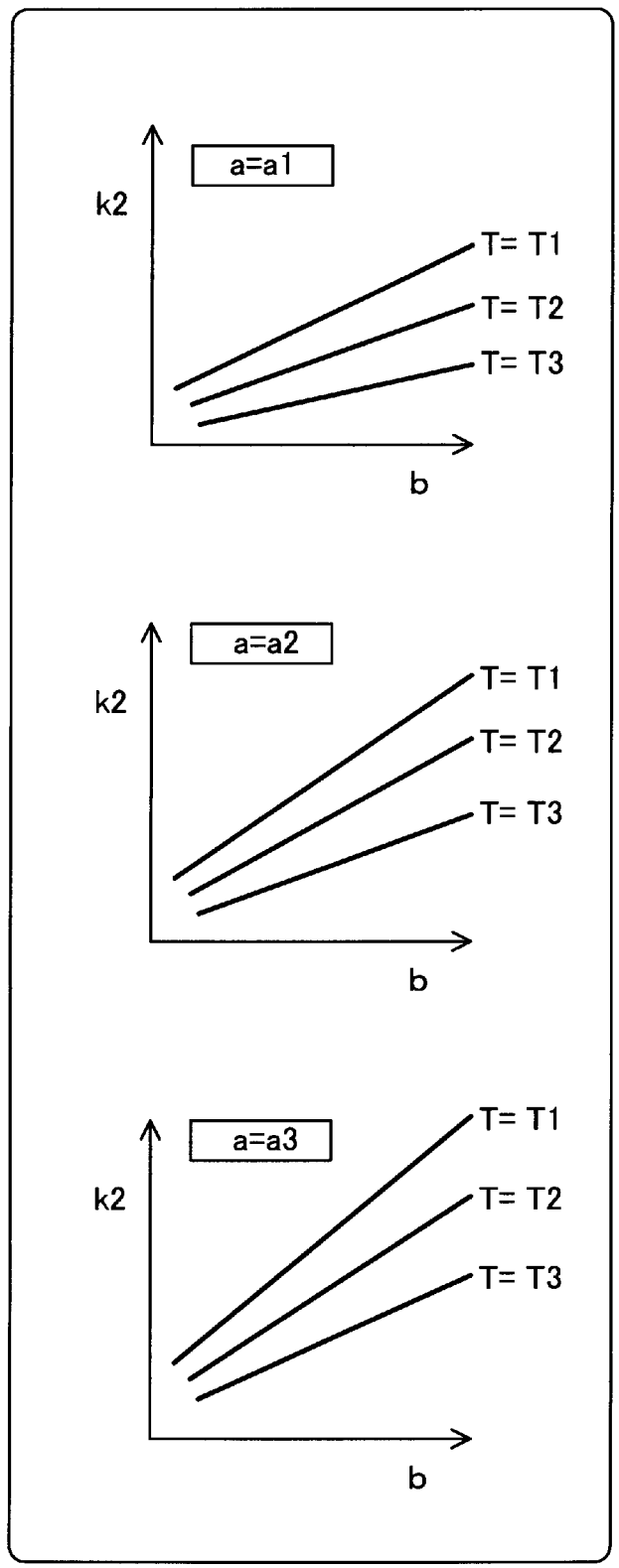
FIG. 7 is an explanatory diagram of a second map in the second embodiment.

In the present embodiment, as shown in FIGS. 5 to 7, the pressure change after reducing the pressure in the diagnostic object to a predetermined pressure is used as the second pressure change, and based on the pressure change, leakage diagnosis is performed.

That is, in the evaporative fuel processing system 1 of the present embodiment, the pump 5 is configured to reduce the pressure in the diagnostic object. Then, the second pressure change is a pressure change in the diagnosis object in a state in which pressurization by the pump 5 is stopped after the pressure in the diagnostic object is reduced to a predetermined pressure.

In the present embodiment, the leak diagnosis by the leak diagnosis unit 7 can be performed in accordance with the flow shown in FIG. 6. The flow of the present embodiment is substantially the same as the flow of FIG. 2 of the first embodiment except steps S3A, S4A, and S5A. In the present embodiment, the pressure of the diagnostic object is reduced by the pump 5 in accordance with the start of the pump 5 in step S3A. Then, in step S4A, it is determined whether the pressure P in the diagnostic object is reduced to a predetermined pressure P2. When the pressure P in the diagnostic object falls below the predetermined pressure P2, the pressure reduction by the pump 5 is ended (see step S5A). That is, the pump 5 is stopped.

Next, immediately after the pump 5 is stopped, a change in pressure detected by the pressure detection unit 61 is measured. That is, the second pressure change is measured (see step S6). Specifically, the pressure change amount within a predetermined time, that is, the pressure change rate is measured. In the present embodiment, in particular, if the leak hole is present, the pressure rises toward the atmospheric pressure. Therefore, in the present embodiment, the pressure increase rate is the second pressure change rate k2.

The first pressure change rate k1 is measured in step S1 in the same manner as in the first embodiment. As a result, also in the present embodiment, two equations, $k1=f(a, b)$ and $k2=g(a, b)$, having two variables of the Reid vapor pressure a of the fuel and the diameter b of the leak hole, are obtained. However, $k2=g(a, b)$ is an equation different from that of the first embodiment. That is, a second map MAP2 which is the second preparation information to be obtained in advance is different from that in the first embodiment. In the present embodiment, the second map MAP2 is, for example, an image shown in FIG. 7.

Since the second pressure change rate k2 is a rate at which the pressure increases from the depressurized state toward the atmospheric pressure, the second pressure change rate K2 tends to be faster as the diameter b of the leak hole is larger, and is likely to be faster as the Reid vapor pressure a is larger, and is more easily faster as the temperature T is higher. Therefore, the second pressure change rate k2 can also be expressed as the function $g(a, b)$. However, the function $g(a, b)$ in the present embodiment is different from the function $g(a, b)$ in the first embodiment.

Then, the diameter b of the leak hole can be calculated by solving the simultaneous equations consisting of the two equations $k1=f(a, b)$ and $k2=g(a, b)$ described above.

Other operations are the same as in the first embodiment. Incidentally, among reference numerals used in the second and subsequent embodiments, the same reference numerals as those used in the embodiment already described represent the same components as those in the embodiment already described, unless otherwise indicated.

In the present embodiment, when measuring the second pressure change, the pressure in the diagnostic object is reduced. At this time, the fuel in the fuel tank 2 is easily volatilized. Then, pressure fluctuation due to fuel volatilization is likely to affect the second pressure change. Therefore, if leak diagnosis is performed without considering the volatility of the fuel, the accuracy of the leak diagnosis is likely to decrease. As in the present embodiment, the diameter b of the leak hole is calculated from the two equations, so that the diameter b can be accurately estimated. That is, the accuracy of the leak diagnosis can be effectively improved.

Further, in the present embodiment, since the pressure in the diagnostic object is reduced at the time of the second pressure change, even if there is a leak hole, it is possible to prevent the evaporative fuel is positively leaked to the outside from actively leaking to the outside during the leak diagnosis.

In addition, the second embodiment has the same functions and advantages as in the first embodiment.

Third Embodiment

Figure 8:
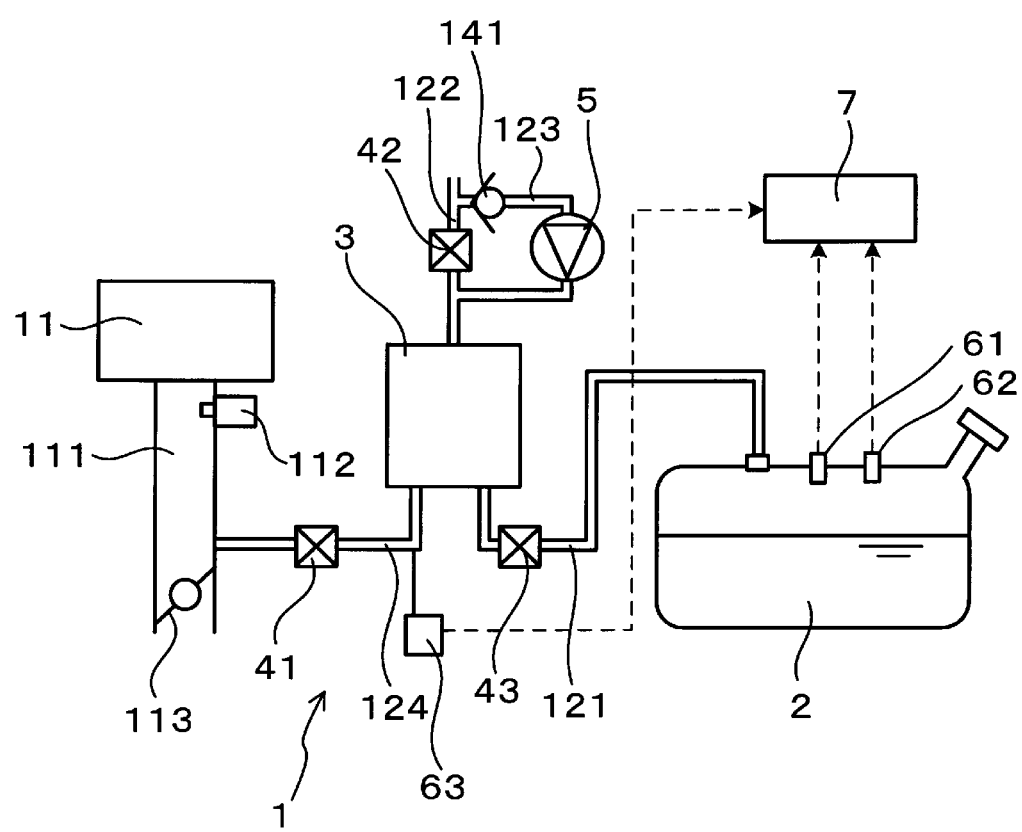
FIG. 8 is a configuration explanatory view of an evaporative fuel processing system according to a third embodiment.
Figure 9:
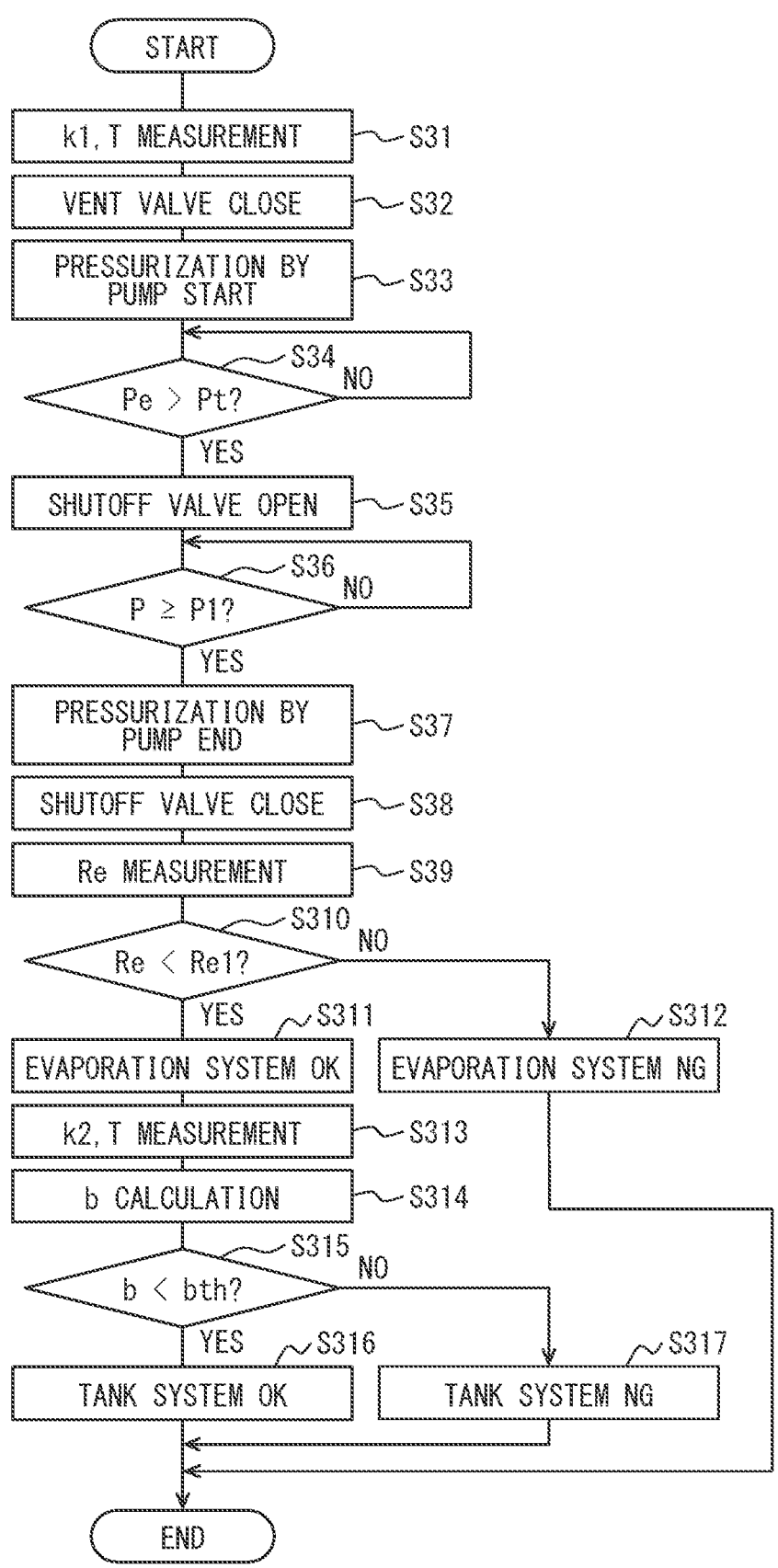
FIG. 9 is a flowchart of leak diagnosis in the third embodiment.

In the present embodiment, as shown in FIGS. 8 and 9, a shutoff valve 43 is provided in the evaporative fuel passage 121.

That is, in the evaporative fuel processing system 1 of the present embodiment, the evaporative fuel passage 121 between the fuel tank 2 and the canister 3 is provided with the shutoff valve 43 which can be opened and closed. The shutoff valve 43 is configured to be able to switch between communication and shutoff between the fuel tank 2 and the canister 3. The shutoff valve 43 can be configured by, for example, a solenoid valve. By closing the shutoff valve 43, the fuel tank 2 and the canister 3 can be shut off. Thus, the fuel tank 2 can be fully closed.

Further, in the present embodiment, the vent valve 42 and the pump 5 are connected in parallel. That is, one end of the bypass passage 123 is connected to the atmosphere side with respect to the vent valve 42 in the vent passage 122, and the other end thereof is connected between the vent valve 42 and the canister 3 in the vent passage 122. The pump 5 is provided in the bypass passage 123. Further, a check valve 141 is also provided in the bypass passage 123.

In addition, the evaporative fuel processing system 1 of the present embodiment also includes a pressure detection unit 63. The pressure detection unit 63 measures the pressure of a closed system which includes the canister 3, and which is closed by the purge valve 41, the vent valve 42, and the shutoff valve 43. In FIG. 8, the pressure detection unit 63 is disposed between the purge valve 41 and the canister 3 in the purge passage 124.

Then, the diagnostic object on the fuel tank 2 side of the shutoff valve 43 (hereinafter referred to as "tank object" as appropriate) and the diagnostic object on the canister 3 side of the shutoff valve 43 (hereinafter referred to as "evaporation object" as appropriate) are separated by using the opening and closing of the shutoff valve 43. Therefore, the leak diagnosis unit 7 can perform the leak diagnosis for each of the tank object and the evaporation object.

Hereinafter, an example of the leak diagnosis in the present embodiment will be described using the flow of FIG. 9.

First, immediately after the vehicle is stopped, the shutoff valve 43 is closed, and the first pressure change rate k1 is measured together with the temperature T as in the first embodiment (see step S31).

Then, the vent valve 42 is closed and pressurization by the pump 5 is started (see steps S32 and S33).

The pressure Pt detected by the pressure detection unit 61 disposed in the fuel tank 2 (hereinafter also referred to as "tank pressure Pt" as appropriate) and the pressure Pe detected by the pressure detection unit 63 provided in the purge passage 124 (hereinafter also referred to as "evaporation pressure Pe" as appropriate) are compared (see step S34). When the evaporation pressure Pe becomes larger than the tank pressure Pt (Pe>Pt), the shutoff valve 43 is opened (see step S35). Then, when the tank pressure Pt reaches the predetermined pressure P1, the pressurization by the pump 5 is ended, and the shutoff valve 43 is closed again (see steps S36, S37 and S38).

In this state, the rate of change Re of the evaporation pressure Pe is measured (see step S39). Then, it is determined whether the change speed Re of the evaporation pressure Pe is less than a predetermined threshold Re1 (see step S310). If the rate of change Re is less than the predetermined threshold Re1, it is determined that there is no abnormal leak in the evaporation object (see step S311). On the other hand, when the change speed Re is equal to or more than the predetermined threshold value Re1, it is determined that there is an abnormal leak in the evaporation object (see step S312). In the evaporation object, since there is almost no influence of the evaporation factor of fuel, that is, the Reid vapor pressure, leak diagnosis can be performed at a simple change rate of evaporation pressure.

If it is determined that there is no abnormal leak in the evaporation object, the process proceeds to step S313, and the second pressure change rate k2 and the temperature T in the tank object are measured (see step S313). Then, as in the first embodiment, the diameter b of the leak hole is calculated, and the presence or absence of an abnormal leak hole in the tank object is diagnosed (see steps S314 to S317).

Other operations are the same as in the first embodiment.

In the present embodiment, by providing the shutoff valve 43, it is possible to divide the diagnostic object into the evaporation object and the tank object, and to perform leak diagnosis in each of systems. It is easy to identify the leak location. And, in the leak diagnosis of the tank object, it is possible to effectively eliminate the influence of the volatility of the fuel and to perform the leak diagnosis with high accuracy.

In addition, the second embodiment has the same functions and advantages as in the first embodiment.

Fourth Embodiment

Figure 10:
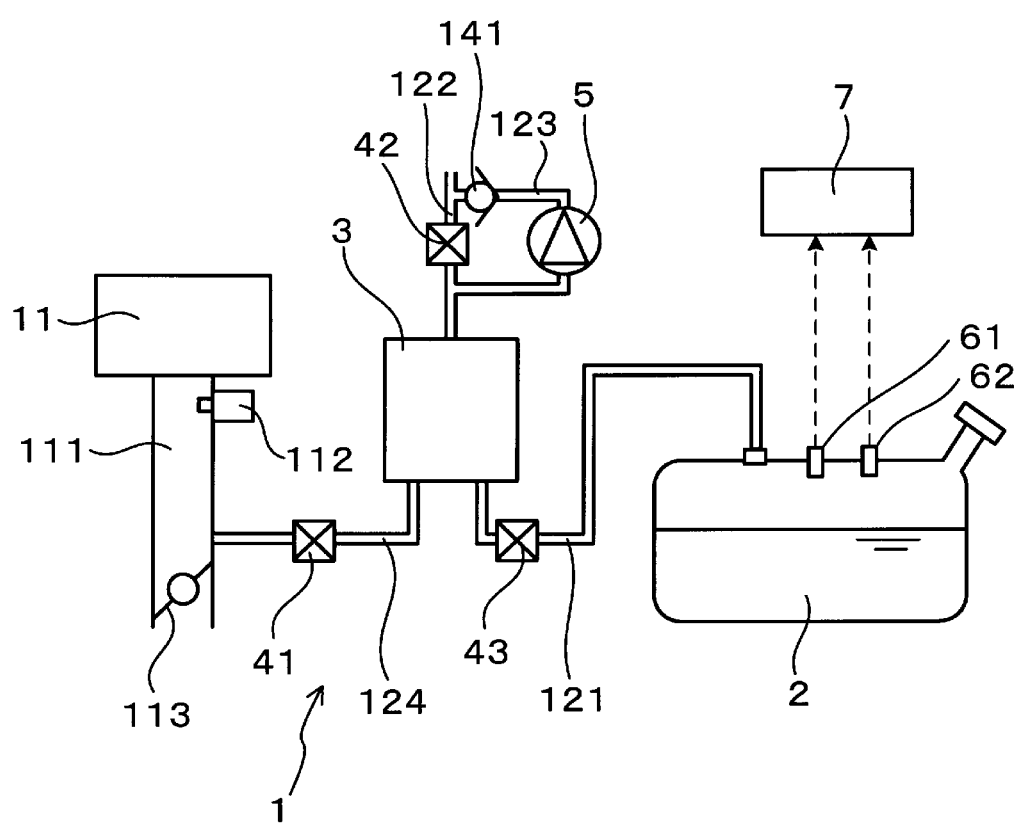
FIG. 10 is a configuration explanatory view of an evaporative fuel processing system according to a fourth embodiment.
Figure 11:
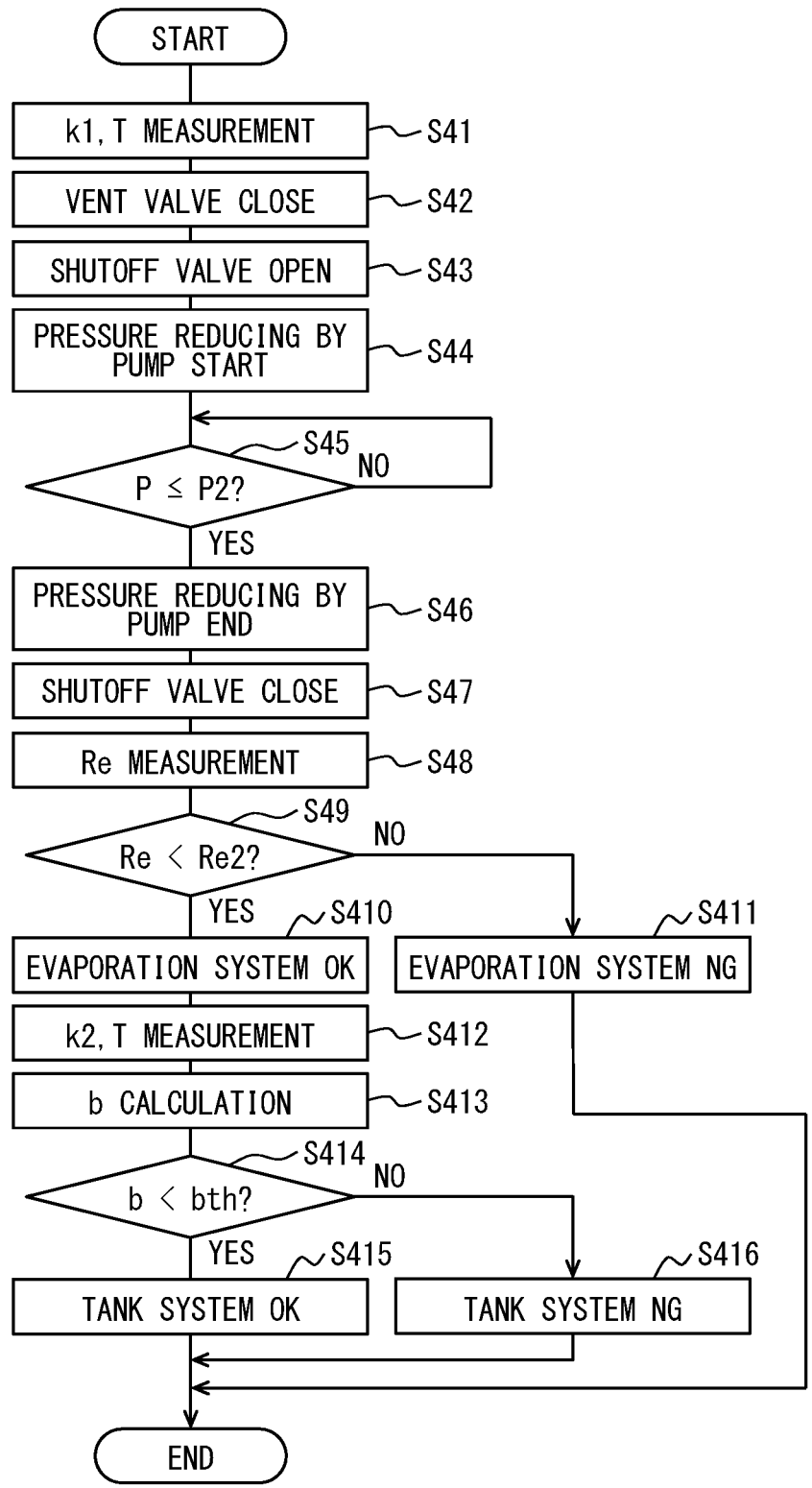
FIG. 11 is a flowchart of leak diagnosis in the fourth embodiment.

In the present embodiment, as shown in FIGS. 10 and 11, the pressure change after reducing the pressure in the diagnostic object to a predetermined pressure is used as the second pressure change, and based on the pressure change, leakage diagnosis is performed.

That is, in the evaporative fuel processing system 1 of the present embodiment, the pump 5 is configured to reduce the pressure in the diagnostic object. Further, the direction of the check valve 141 is a direction that prevents the inflow of gas from the atmosphere side to the canister 3 side. The other configuration is the same as that of the third embodiment.

Also in the present embodiment, as in the third embodiment, the tank object and the evaporation object can be divided by using the opening and closing of the shutoff valve 43, and the leak diagnosis unit 7 can perform the leak diagnosis for each of systems.

Hereinafter, an example of the leak diagnosis in the present embodiment will be described using the flow of FIG. 11.

Immediately after the vehicle is stopped, the first pressure change rate k1 and the temperature T are measured, and thereafter, until the vent valve 42 is closed. These steps are the same as in the third embodiment (see steps S41 and S42). Thereafter, the shutoff valve 43 is opened and the pump 5 is operated (see steps S43 and S44). That is, the pressure reduction in the diagnostic object by the pump 5 is started.

When the pressure P in the fuel tank 2 is reduced to a predetermined value P2, the pressure reduction by the pump 5 is ended, and the shutoff valve 43 is closed (see steps S45, S46, and S47). In this state, the pressure change rate Re of the evaporation object is measured (see step S48). The pressure Pe of the evaporation object at this time will rise if a leak hole exists. Therefore, the pressure change rate Re is the rate of pressure increase.

The pressure change rate Re is compared with a predetermined threshold value Re2, and leakage diagnosis of the evaporation object is performed (see steps S49, S410, and S411). If it is determined that there is no abnormal leak in the evaporation object, the process proceeds to step S412, the second pressure change rate k2 and temperature T are measured, and the diameter b of the leak hole is calculated (see steps S412 and S413). It is the same as that of the third embodiment in that the leak diagnosis in the tank object is performed using this diameter b (see steps S414, S415, and S416).

Others are the same as in the second embodiment or the third embodiment.

In the present embodiment, both advantages of the second embodiment and the third embodiment are obtained.

In the above-mentioned embodiment, although the first pressure change and the second pressure change are obtained by measuring the rate of pressure change, the acquisition of the first and second pressure changes is not limited to this measurement. The first pressure change and the second pressure change can also be measured, for example, based on the time to reach a predetermined pressure or the like.

Further, the detection timings of the first pressure change and the second pressure change described above and the leak diagnosis method are merely examples, and various timings and methods can be adopted.

The present disclosure is not limited to the embodiments described above, and various modifications may be adopted within the scope of the present disclosure without departing from the spirit of the disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

In the assumable evaporative fuel processing system, in order to accurately determine the presence or absence of a leak based on the change in the internal pressure of the fuel tank, it is necessary as a premise that the temperature change in the fuel tank is large to some extent. There are cases where the temperature change of the fuel tank does not occur sufficiently. Then, it may be difficult to perform a highly accurate leak diagnosis.

The present disclosure has been made in view of the above problems, and provides an evaporative fuel processing system capable of performing leak diagnosis with high accuracy.

One aspect of the present disclosure provides an evaporative fuel processing system that includes
a fuel tank (2) that stores fuel of an internal combustion engine (11),
a canister (3) that adsorbs evaporative fuel generated in the fuel tank,
a pump (5) that pressurizes and depressurizes an inside of a diagnostic object including the fuel tank,
a pressure detection unit (61) configured to detect the pressure in the evaporative fuel processing system,
a temperature detection unit (62) configured to detect the temperature in the diagnostic object,
a leak diagnosis unit (7) configured to diagnose leaks in the diagnostic object.

The leak diagnosis unit diagnoses leaks based on
a first pressure change (k1) which is a change in pressure detected by the pressure detection unit when the temperature in the diagnosis object changes,
a second pressure change (k2) which is a change in pressure detected by the pressure detection unit when the inside of the diagnosis object is pressurized or depressurized by the pump,
a detected temperature (T) by the temperature detection unit,
a first preparation information (MAP1) in which a relationship between a physical quantity (b) relating to a leak degree in the diagnostic object, a physical property value (a) relating to the volatility of the fuel, the temperature in the diagnostic object, and the first pressure change is determined in advance, and
a second preparation information (MAP2) in which a relationship between a physical quantity (b) relating to a leak degree in the diagnostic object, a physical property value (a) relating to the volatility of the fuel, the temperature in the diagnostic object, and the second pressure change is determined in advance.

In the evaporative fuel processing system, the leak diagnosis unit is configured to diagnose leak in the diagnostic object based on the first pressure change, the second pressure change, the temperature in the diagnostic object, the first preparation information and the second preparation information. Thereby, the diagnostic accuracy by the leak diagnosis unit can be increased.

As described above, according to the above aspect, it is possible to provide an evaporative fuel processing system capable of performing leak diagnosis with high accuracy.

The invention claimed is:

1. An evaporative fuel processing system, comprising:
a fuel tank that stores fuel of the internal combustion engine;
a canister that adsorbs evaporative fuel generated in the fuel tank;
an evaporative fuel passage connected to an upper part of the fuel tank and connecting the fuel tank and the canister so that the a fuel evaporated in the fuel tank reaches the canister;
a purge passage connecting the canister and an intake system of the internal combustion engine;
a first valve that supplies evaporated fuel from the canister to the intake system by opening and closing the purge passage;
a vent passage connected to the canister to introduce an atmospheric air;

a second valve connected to the vent passage;
a diagnostic object that is a closed system, an inside of which includes both the canister and the fuel tank is closed by closing the first valve and the second valve;
a pump that supplies the atmospheric air from an atmosphere side to the canister and pressurizes and depressurizes an inside of the diagnostic object;
a pressure detection unit configured to detect a pressure in the diagnostic object;
a temperature detection unit configured to detect a temperature in the diagnostic object; and
a leak diagnosis unit configured to diagnose leak in the diagnostic object based on
   a first pressure change which is a change in pressure detected by the pressure detection unit when the temperature in the diagnostic object changes,
   a second pressure change which is a change in pressure detected by the pressure detection unit when the inside of the diagnostic object is pressurized or depressurized by the pump,
   a detected temperature by the temperature detection unit,
   a first preparation information in which a relationship between a physical quantity relating to a leak degree in the diagnostic object, a physical property value relating to the volatility of the fuel, the temperature in the diagnostic object, and the first pressure change is determined in advance, and
   a second preparation information in which a relationship between a physical quantity relating to a leak degree in the diagnostic object, a physical property value relating to the volatility of the fuel, the temperature in the diagnostic object, and the second pressure change is determined in advance.

2. The evaporative fuel processing system according to claim 1, wherein
the pump is configured to pressurize the inside of the diagnostic object, and
the second pressure change is a pressure change in the diagnostic object in a state in which pressurization by the pump is stopped after the inside of the diagnostic object is pressurized to a predetermined pressure.

3. The evaporative fuel processing system according to claim 1, wherein
the pump is configured to depressurize the inside of the diagnostic object, and
the second pressure change is a pressure change in the diagnostic object in a state in which depressurization by the pump is stopped after the pressure in the diagnostic object is reduced to a predetermined pressure.

4. The evaporative fuel processing system according to claim 1, wherein
the evaporative fuel passage between the fuel tank and the canister is provided with a shutoff valve which can be opened and closed so as to switch between communication and shutoff between the fuel tank and the canister, and
the diagnostic object on the fuel tank side of the shutoff valve and the diagnostic object on the canister side of the shutoff valve are separated by using the opening and closing of the shutoff valve so that the leak diagnosis unit perform the leak diagnosis for each of the diagnostic object.

5. The evaporative fuel processing system according to claim 1, wherein
the first preparation information is prepared as a first map in which a relationship among the Reid vapor pressure, the diameter of the leak hole, the temperature, and the first pressure change rate is obtained in advance, and
in the first map, after setting a plurality of diameters, a plurality of graphs corresponding to a plurality of temperatures with the Reid vapor pressure on a horizontal axis and the first pressure change rate on a vertical axis are shown.

6. The evaporative fuel processing system according to claim 1, wherein
the second preparation information is prepared as a second map in which a relationship among the Reid vapor pressure, the diameter of the leak hole, the temperature, and the second pressure change rate is obtained in advance, and
in the second map, after setting a plurality of the Reid vapor pressures, a plurality of graphs corresponding to a plurality of temperatures with the diameter of the leak hole on a horizontal axis and the second pressure change rate on a vertical axis are shown.

7. The evaporative fuel processing system according to claim 5, wherein
the first pressure change rate is faster as the Reid vapor pressure increases, and is suppressed as the diameter of the leak hole is larger, and is faster as the temperature is higher.

8. The evaporative fuel processing system according to claim 6, wherein
when the second pressure change rate is a rate at which the pressure decreases from the pressurized state toward the atmospheric pressure, the second pressure change rate is faster as the diameter of the leak hole is larger, and is suppressed as the Reid vapor pressure is larger, and is suppressed as the temperature is higher.

9. The evaporative fuel processing system according to claim 6, wherein
when the second pressure change rate is a rate at which the pressure increases from the depressurized state toward the atmospheric pressure, the second pressure change rate is faster as the diameter of the leak hole is larger, and is faster as the Reid vapor pressure is larger, and is faster as the temperature is higher.

10. The evaporative fuel processing system according to claim 5, wherein
the leak diagnosis unit calculates the diameter of the leak hole based on the first pressure change rate and the second pressure change rate, and performs the leak diagnosis by comparing the calculated diameter of the leak hole with a reference threshold.

11. The evaporative fuel processing system according to claim 6, wherein
the leak diagnosis unit determines that
there is no abnormal leak in the diagnostic object on the canister side of the shutoff valve, when a calculated rate of change of the evaporation pressure is less than a predetermined threshold, and
there is an abnormal leak in the diagnostic object on the canister side of the shutoff valve, when the rate of change is equal to or more than the predetermined threshold value.

* * * * *